2,920,845
AIRPLANE MOVING DEVICE

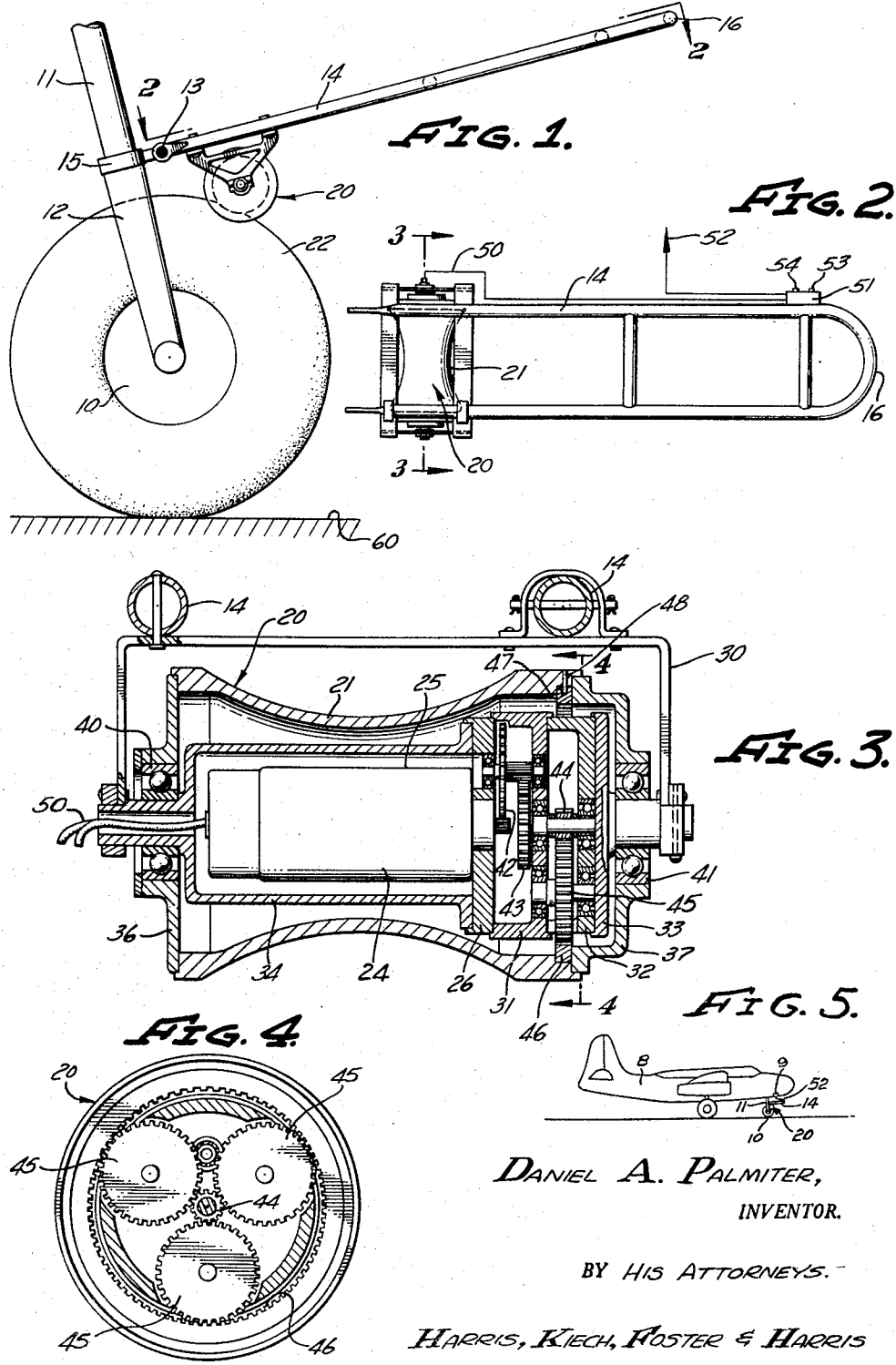
Daniel A. Palmiter,
INVENTOR.
BY HIS ATTORNEYS.
Harris, Kiech, Foster & Harris

United States Patent Office 2,920,845
Patented Jan. 12, 1960

Daniel A. Palmiter, Alhambra, Calif., assignor to Shepherd Machinery Co., Los Angeles, Calif., a limited partnership Application July 22, 1955, Serial No. 523,682

2 Claims. (Cl. 244—50)

The invention may be summarily described as a device by which an operator standing, and walking, on the ground may readily move an airplane from, and to, desired locations on the ground, said movement being produced by electric power, preferably delivered from the airplane. Power is frictionally transmitted from a rotating drum to a wheel of the landing gear of the plane, the application of power being controlled by the operator.

An object of the invention is to provide an airplane moving device by which an operator standing on the runway adjacent an airplane may manually steer, propel and stop the airplane with the exertion of nominal human forces, utilizing the power sources normally available within the airplane.

A further object of the invention is to provide a structure of the class described which is relatively inexpensive to manufacture, which is effectual for the purpose intended, and which may be relatively easily secured in an operative position and used for the purpose intended. The actual details of this invention and other advantages of it are best more fully explained with reference to the accompanying drawing forming, by reference, a part of this specification. In the drawing:

Fig. 1 is a side view illustrating the use of the instant invention upon the front or lead wheel of a tricycle landing gear for an aircraft;

Fig. 2 is a top view of the invention taken at line 2—2 of Fig. 1 of the drawing;

Fig. 3 is a cross-sectional view taken at line 3—3 of Fig. 2 of the drawing;

Fig. 4 is a cross-sectional view taken at line 4—4 of Fig. 3 of the drawing, illustrating gear means which are employed with the invention; and Fig. 5 is a diagrammatic view illustrating the use of the invention.

In the embodiment of the invention shown in the drawing, 10 is a wheel which it is desired to rotate for the purpose of moving an airplane 8 from one ground position to another. The wheel 10 is a portion of the landing gear of a plane, the plane being partially supported by a strut 11 on a fork 12. A pivot 13 connects one end of a frame 14 to a member 15 fixed on the strut 11. The frame 14 can be conveniently grasped by an operator by a curved front end 16.

Carried below the frame 14 is a driving drum 20 having a curved outer surface 21, as shown in Fig. 3. The drum is so placed that it can be forced into firm contact with the outer portion of a tire 22 on the wheel 10 with considerable pressure if the operator forces the end 16 of the frame 14 downwardly. The long lever arm available to the operator enables him to effectively eliminate slipping between the drum and the tire and to precisely control the slipping when desirable, thereby controlling the forward speed of the airplane.

The drum is driven by a motor 24, the frame 25 of which is fixed to an end plate 26. The end plate 26 is rigidly supported within a U-shaped bracket 30 by plates 31, 32 and 33 and a shell 34, the motor frame 25 and each of the intermediate members being non-rotatable with respect to the bracket 30. The bracket 30 is in turn rigidly mounted on the frame 14. End caps 36, 37 are attached to the respective ends of the drum 20, the end caps 36, 37 being rotatably mounted on the shell 34 and the plate 33 respectively by bearings 40, 41, thereby permitting the drum to rotate about the enclosed motor. The drum is driven by the rotor (not shown) of the motor 24 through two spur gear reductions 42 and 43 and a planetary gear reduction consisting of a sun gear 44, three planet gears 45 and a ring gear 46, shown in detail in Fig. 4. The bearings of these gear reductions are carried in the plates 26, 31, and 32, the ring gear 46 being mounted in a shoulder 47 in the drum 20 by suitable means, such as a pin 48.

Power is supplied to the motor 24 by a cable 50 through a control switch 51 mounted on the frame 14 adjacent the end 16. Any suitable power source may be utilized to operate the motor; however, it is preferable to connect the input end 52 of the cable 50 to the electric power supply 9 of the aircraft being moved, thus reducing the required cabling to a minimum. The switch 51 has a forward control button 53 and a reverse control button 54, thereby permitting the rotating drum 20 to accelerate and decelerate the aircraft as desired during the towing operation.

In operation one end of the frame 14 is attached by the pivot 13 to the member 15 carried on the strut 11. The drum 20 rests on the upper surface of the tire 22, being held there solely by the weight of the drum 20 and the frame 14. The operator can then lift the drum 20 out of contact with the tire 22 if he desires to do so by lifting the end 16 of the frame 14.

Whenever it is desired to move the airplane over a runway 60, the motor 24 is started by the use of the controller 51 and the drum 20 frictionally engages the thread of the tire 22 on the wheel 10. Depending upon how the operator uses the controller 51, the wheel 10 can be rotated forwardly or backwardly from its initial position. The operator then leads or pushes the airplane into the desired position, steering the airplane by rotating the strut 11 via the member 15 and the frame 14. If necessary, the operator can increase the frictional grip of the drum 20 on the tire by applying some of the operator's weight to the frame 14.

The gear reduction is such that the airplane is moved at a walking rate and, of course, due to a high gear reduction, a small motor can exert a high drawbar pull on the aircraft.

The use of this device obviates the necessity of trying to "taxi" the airplane about the runway by use of its propellers. Particularly, by the use of this device the plane can be "backed up" easily due to the close control available to the operator over speed and direction of movement.

I claim as my invention:

1. In combination: an airplane having a steerable landing gear including a wheel having a tread; a source of electric power in the airplane; a manually actuated attachment for moving the airplane along a runway at a controlled velocity along a desired path, said attachment including a pivot member rigidly fastened to the steerable landing gear of the airplane above said wheel; a frame mounted on said pivot member for movement relative thereto in a vertical plane by an operator standing on a runway, said frame and said pivot member moving in unison in a horizontal plane for turning the wheel in a horizontal plane for manual steering of the moving airplane by the operator; a driving drum mounted on said frame and frictionally engageable with the tread of the wheel when said frame is manually urged downward by the operator; a reversible electric motor mounted on said frame and coupled to said drum in driving relationship; control means mounted on said frame for operation by the operator; and circuit means connecting said motor and said control means to said power source in the airplane, said control means being manually operable to actuate said motor in the forward and reverse directions for moving the airplane when said drum is manually urged downward into engagement with the wheel.

2. In a manually actuated attachment for the landing gear of an airplane for moving the airplane along a runway at a controlled velocity along a desired path, the airplane having an electric power source therein, the combination of: a pivot member adapted for rigid fastening to the steerable landing gear of an airplane above a wheel thereof; a frame mounted on said pivot member adapted for movement relative thereto in a vertical plane by an operator standing on a runway, said frame and said pivot member moving in unison in a horizontal plane for turning the wheel in a horizontal plane for manual steering of the moving airplane by the operator; a driving drum mounted on said frame and frictionally engageable with the tread of the wheel when said frame is manually urged downward by the operator; a reversible electric motor mounted within said drum; reduction gearing coupling said motor to said drum in driving relationship; control means mounted on said frame for operation by the operator; and circuit means adapted for connecting said motor and said control means to a power source in the airplane, said control means being manually operable to actuate said motor in the forward and reverse directions for moving the airplane when said drum is manually urged downward into engagement with the wheel.

References Cited in the file of this patent

UNITED STATES PATENTS

| | | |
|---|---|---|
| 567,445 | Barrows | Sept. 8, 1896 |
| 1,313,537 | Jones | Aug. 19, 1919 |
| 1,764,851 | Palm | June 17, 1930 |
| 1,866,380 | Wagner | July 5, 1932 |
| 2,409,552 | Donnellan | Oct. 15, 1946 |
| 2,441,801 | Dever | May 18, 1948 |
| 2,539,010 | Cox | Jan. 23, 1951 |
| 2,626,002 | Wubbe | Jan. 20, 1953 |

FOREIGN PATENTS

| | | |
|---|---|---|
| 834,486 | Germany | Mar. 20, 1952 |